US012025729B2

(12) United States Patent
Bauduin et al.

(10) Patent No.: US 12,025,729 B2
(45) Date of Patent: Jul. 2, 2024

(54) METHOD FOR RADAR DETECTION AND DIGITALLY MODULATED RADAR ROBUST TO IQ IMBALANCE

(71) Applicant: Imec vzw, Leuven (BE)

(72) Inventors: Marc Bauduin, Brussels (BE); Andre Bourdoux, Theux (BE)

(73) Assignee: Imec vzw, Leuven (BE)

( * ) Notice: Subject to any disclaimer, the term of this patent is extended or adjusted under 35 U.S.C. 154(b) by 401 days.

(21) Appl. No.: 17/527,796

(22) Filed: Nov. 16, 2021

(65) Prior Publication Data
US 2022/0155412 A1  May 19, 2022

(30) Foreign Application Priority Data

Nov. 17, 2020 (EP) .................... 20208013

(51) Int. Cl.
G01S 7/35 (2006.01)
G01S 13/32 (2006.01)
G01S 13/58 (2006.01)

(52) U.S. Cl.
CPC .......... G01S 7/354 (2013.01); G01S 7/358 (2021.05); G01S 13/325 (2013.01); G01S 13/58 (2013.01)

(58) Field of Classification Search
CPC ........ G01S 7/354; G01S 7/358; G01S 13/325; G01S 13/58
See application file for complete search history.

(56) References Cited

U.S. PATENT DOCUMENTS

| 2015/0341203 A1* | 11/2015 | Morita ................. G01S 7/288 375/282 |
| 2017/0212213 A1* | 7/2017 | Kishigami ............ G01S 13/284 |
| 2020/0191940 A1* | 6/2020 | Wu ..................... H04B 7/0413 |

FOREIGN PATENT DOCUMENTS

EP  3627787 A1  3/2020

OTHER PUBLICATIONS

Extended European Search Report and Written Opinion, Application No. EP20208013.1, dated May 17, 2021, 7 pages.

(Continued)

*Primary Examiner* — Peter M Bythrow
*Assistant Examiner* — Nazra Nur Waheed
(74) *Attorney, Agent, or Firm* — McDonnell Boehnen Hulbert & Berghoff LLP

(57) ABSTRACT

A method is provided for facilitating radar detection robust to IQ imbalance. The method comprises the step of generating a radar signal in digital domain comprising a number of M periodic repetitions of a code sequence with a length Lc, multiplied with a progressive phase rotation $$e^{j \cdot \frac{\pi}{K} \cdot n},$$

where Lc and M are integers, K is an integer or a non-integer, and n is a discrete integer variable. The method further comprises the step of generating a process input signal in digital domain from a reflection signal corresponding to the radar signal by multiplying the reflection signal with a progressive phase rotation (Continued)

$e^{-j\cdot\frac{\pi}{K}\cdot n}$.

In this context, K is defined such that a ratio $$\frac{Lc}{K}$$

is a non-integer, and M is defined such that a ratio $$\frac{Lc\cdot M}{K}$$

is an integer.

20 Claims, 15 Drawing Sheets

(56) References Cited

OTHER PUBLICATIONS

Schweizer, Benedikt, Christina Knill, Daniel Schindler, and Christian Waldschmidt. "IQ-Imbalance Compensation for Wideband OFDM-Radar." In 2020 14th European Conference on Antennas and Propagation (EuCAP), pp. 1-5. IEEE, 2020.

* cited by examiner

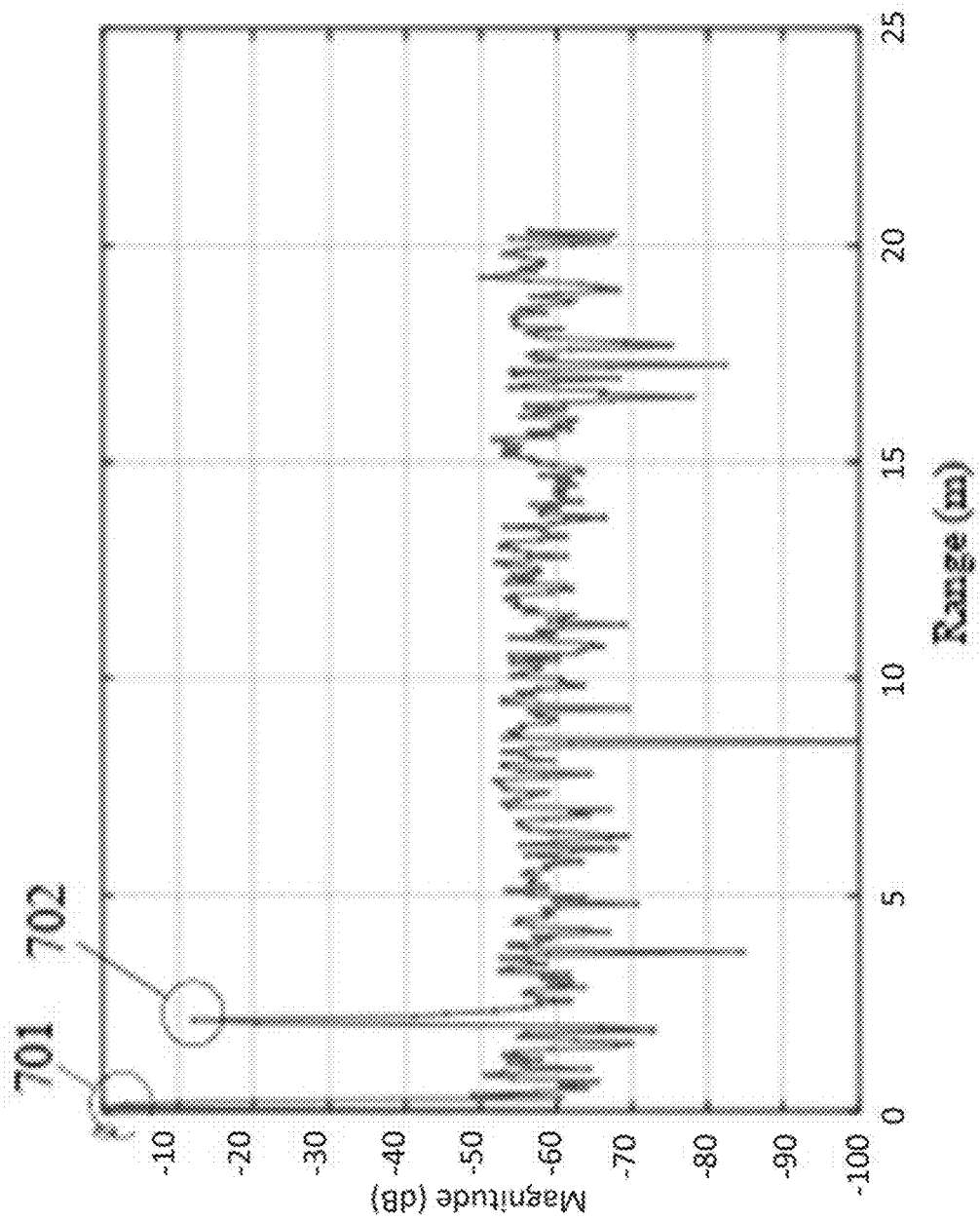

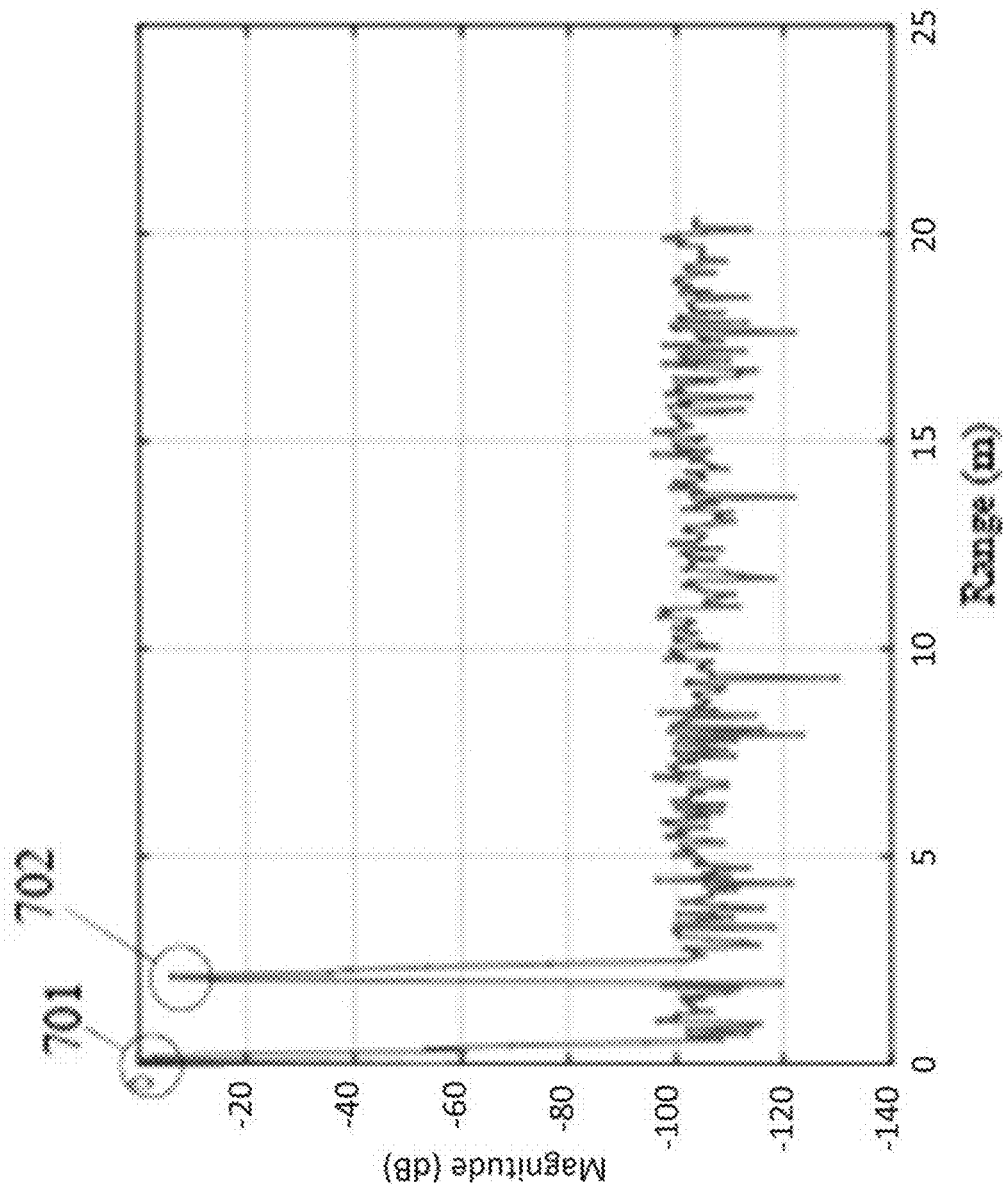

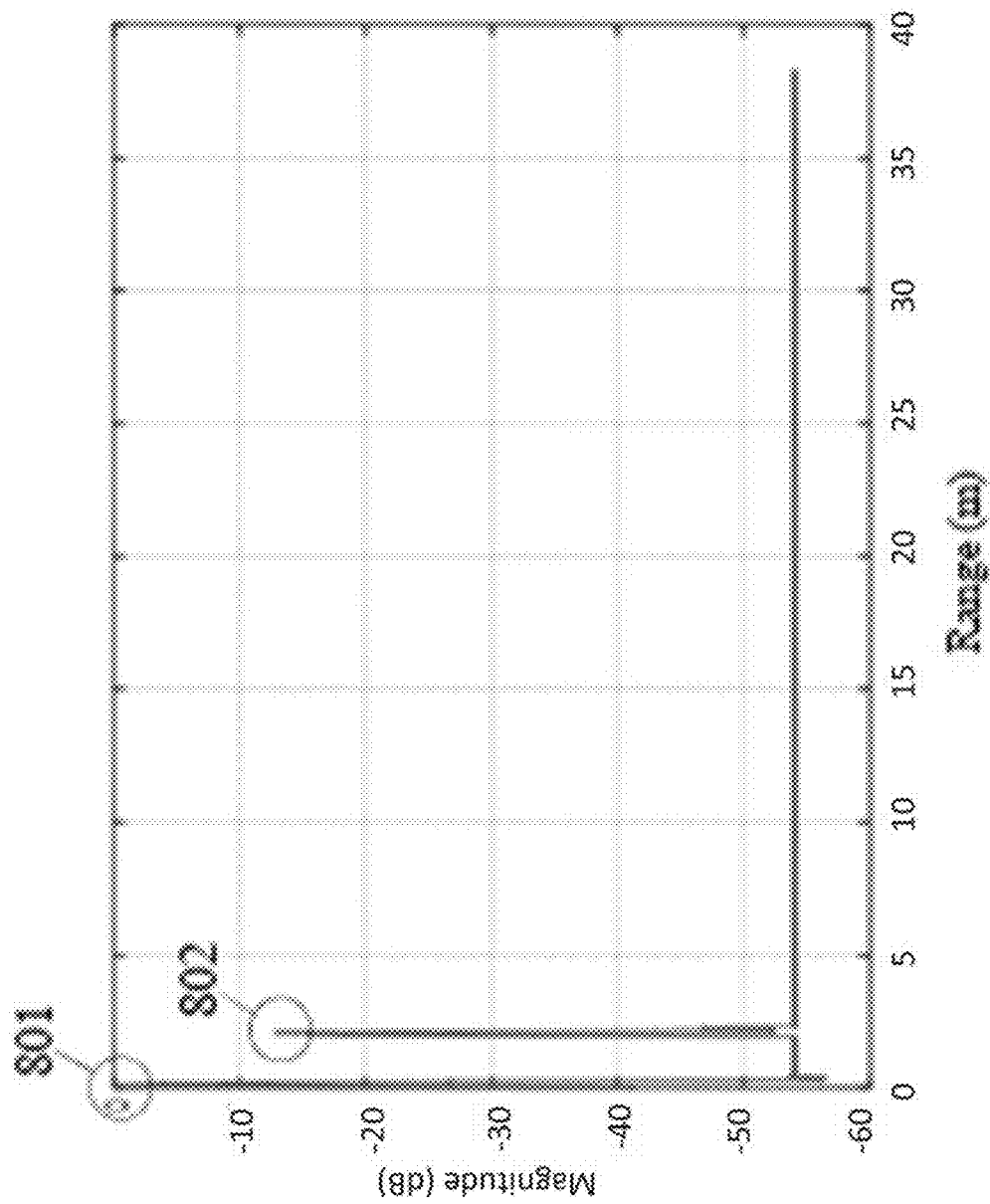

METHOD FOR RADAR DETECTION AND DIGITALLY MODULATED RADAR ROBUST TO IQ IMBALANCE

CROSS-REFERENCE TO RELATED APPLICATIONS

The present application is a non-provisional patent application claiming priority to European Patent Application No. 20208013.1, filed on Nov. 17, 2020, the contents of which are hereby incorporated by reference.

FIELD OF THE DISCLOSURE

The disclosure relates to radar signal generation and reception, for example in digitally modulated radars, in order to facilitate radar operation robust to non-idealities associated with radar transceivers.

BACKGROUND

Digitally modulated radars are now becoming prominent due to their inherent capability of being programmed for different applications and their ability to perform subsequent processing by digital signal processing techniques. In this regard, the data is generally expressed as complex data values, with real and imaginary constituents typically termed as In-phase (I) and Quadrature (Q) components, respectively. Signal path characteristics such as gain and phase to the point where I and Q signal components become digital data require a very high degree of balance in order to maintain signal integrity.

On the other hand, any mismatch between I and Q signal components will allow artifacts to be generated, e.g. time or range sidelobes in radar range profiles and/or in radar range-Doppler maps or ghosts in radar range-Doppler maps, and therefore degrades the radar's performance. Furthermore, additional front-end non-linearity, especially power amplitude non-linearity from transmitter power amplifier, may manifest along the signal path, which may also produce such undesired artifacts and further degrade the overall performance.

For example, the document EP 3 627 787 A1 presents a radar detection technique that is robust to IQ imbalance. In particular, EP 3 627 787 A1 discloses the generation of an OFDM radar signal based on Hadamard transform that is robust to IQ imbalance. Although the OFDM radar signal of EP 3 627 787 A1 is superior to any OFDM radar in terms of transmitter power amplifier non-linearity robustness, the presented technique is only limited to OFDM radars and cannot be implemented for a phase modulated continuous wave (PMCW) radar.

SUMMARY

The disclosure provides a method and a digitally modulated radar for facilitating radar detection robust to conventional front-end non-idealities, which can be implemented for all digitally modulated radars in general.

According to a first aspect of the disclosure, a method is provided for facilitating radar detection robust to IQ imbalance. The method comprises the step of generating a radar signal in the digital domain comprising a number of M periodic repetitions of a code sequence with a length Lc, multiplied with a progressive phase rotation $$e^{j\frac{\pi}{K}\cdot n},$$

where Lc and M are integers, K is an integer or a non-integer, and n is a discrete integer variable, i.e. discrete time index corresponding to the code rate. The method further comprises the step of generating a process input signal in digital domain from a reflection signal corresponding to the radar signal by multiplying the reflection signal with a progressive phase rotation $$e^{-j\frac{\pi}{K}\cdot n}.$$

In this context, K is defined such that a ratio $$\frac{Lc}{K}$$

is a non-integer, and M is defined such that a ratio $$\frac{Lc \cdot M}{K}$$

is an integer.

Therefore, the disclosure includes a technique to generate radar signals that is robust to front-end non-idealities. The disclosure further includes a processing of radar detections from the radar signals, where the signal generation and the signal processing are not limited to the type of code sequence, i.e. not limited to the type of modulation scheme used in a digitally modulated radar. Code sequence length Lc, and variables such as K and M may be predetermined, defined, and/or selected irrespective of the type of code sequence and/or modulation scheme.

For example, the method further comprises the step of correlating the process input signal with respect to the code sequence in order to generate a succession of range profiles. In addition, the method further comprises the step of accumulating a number of M consecutive range profiles.

The radar signal can comprise periodic repetitions of the code sequence and the reflection signal generally comprises a linear combination of delayed version of the code sequence. This delay is proportional to the target range location. In order to estimate the delay, the reflection signal is correlated with the transmitted code sequence (or the complex conjugate of the transmitted code sequence), which produces a range profile. The range profile contains a peak at the location of each target, which is proportional to the power reflected back from the targets. In addition, the accumulation of multiple consecutive range profiles (e.g. a number of M range profiles) can improve the signal-to-noise ratio.

For example, the method further comprises the step of defining Lc with respect to the maximum unambiguous range of the radar for a given radar bandwidth, where the maximum unambiguous range of the radar is given by its ability to receive the reflected pulse or chip completely before the next transmitting pulse or chip. Additionally, the radar bandwidth is for example defined based on a predefined range resolution, i.e. the measurement of smallest distance of separation of its targets.

For example, the method further comprises the step of generating the radar signal comprising a number of N periodic repetitions of the number of M periodic repetitions of the code sequence, where N is an integer. In addition, the method further comprises the step of processing a number of N range profiles in order to produce a range-Doppler map. In other words, the number of repetitions N define the number of samples used for Doppler processing in order to estimate the target velocity.

For example, the code sequence corresponds to a binary code sequence or a real code sequence or a complex code sequence. In this regard, if the code sequence corresponds to a binary code sequence, e.g. the modulation corresponds to binary phase shift keying (BPSK), the method further comprises the step of defining K as an integer or a non-integer given by:

$$K = \frac{\pm 3}{1 + 3d}$$

where d is an integer.

Therefore, the disclosure further includes a modulation specific (BPSK) implementation of the method in order to address additional non-idealities of the front-end in addition to the IQ imbalance. In particular, the disclosure additionally addresses the power amplitude non-linearity and further includes a radar signal generation and processing scheme that is robust to the non-linearity. The power amplitude non-linearity results from non-linear distortions introduced in the transmitter power amplifier, and further introduces unwanted artifacts, e.g. range sidelobes in the range profiles and/or in the range-Doppler maps or ghosts in the range-Doppler maps.

According to a second aspect of the disclosure, a digitally modulated radar is provided for facilitating radar detection robust to IQ imbalance. The digitally modulated radar comprises a code generation unit configured to generate a radar signal in digital domain comprising a number of M periodic repetitions of a code sequence with a length Lc, multiplied with a progressive phase rotation $$e^{j \cdot \frac{\pi}{K} \cdot n},$$

where Lc and M are integers, K is an integer or a non-integer, and n is a discrete integer variable, i.e. discrete time index corresponding to the code rate.

The digitally modulated radar further comprises a processing unit configured to generate a process input signal in digital domain from a reflection signal corresponding to the radar signal by multiplying the reflection signal with a progressive phase rotation $$e^{-j \cdot \frac{\pi}{K} \cdot n}.$$

In this context, the code generation unit is further configured to define K such that a ratio $$\frac{Lc}{K}$$

is a non-integer. Moreover, the code generation unit is further configured to define M such that a ratio $$\frac{Lc \cdot M}{K}$$

is an integer.

Therefore, the disclosure includes a technique to generate radar signals as well as to process radar detections, which is robust to front-end non-idealities and is not limited to the type of code sequence and/or modulation scheme used in a digitally modulated radar.

For example, the digitally modulated radar further comprises a transmission path configured to transmit the radar signal comprising at least one digital to analog converter, at least one low pass filter, at least one mixer, and at least one power amplifier. In addition, the digitally modulated radar further comprises a reception path configured to receive the reflection signal comprising at least one low noise amplifier, at least one mixer, at least one low pass filter, and at least one analog to digital convener. By further example, the transmission path is configured to convey I and Q signal components with their respective domain conversion and successive filtration. Analogously, the reception path is configured to convey I and Q signal components with their respective filtration and successive domain conversion.

For example, the processing unit is further configured to correlate the process input signal with respect to the code sequence in order to generate a succession of range profiles. In this regard, the processing unit is further configured to accumulate a number of M consecutive range profiles. The accumulation of multiple consecutive range profiles (e.g. a number of M range profiles) can improve the signal-to-noise ratio.

For example, the code sequence corresponds to a binary code sequence or a real code sequence or a complex code sequence. In this regard, in the case the code sequence corresponds to a binary code sequence, the code generation unit is further configured to define K as an integer or a non-integer given by:

$$K = \frac{\pm 3}{1 + 3d}$$

where d is an integer. The disclosure further includes a modulation specific (BPSK) implementation in order to address additional non-idealities of the front-end in addition to the IQ imbalance.

BRIEF DESCRIPTION OF THE FIGURES

The above, as well as additional, features will be better understood through the following illustrative and non-limiting detailed description of example embodiments, with reference to the appended drawings.

FIG. 7C shows an APS range profile after accumulation for a sequence length of 544 with pi/2-BPSK modulation, according to an example.

FIG. 7D shows an APS range profile after accumulation for a sequence length of 544 with pi/3-BPSK modulation, according to an example.

FIG. 8B shows an M-sequence range profile after accumulation for a sequence length of 511 with MSK modulation, according to an example.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

Figure 1:
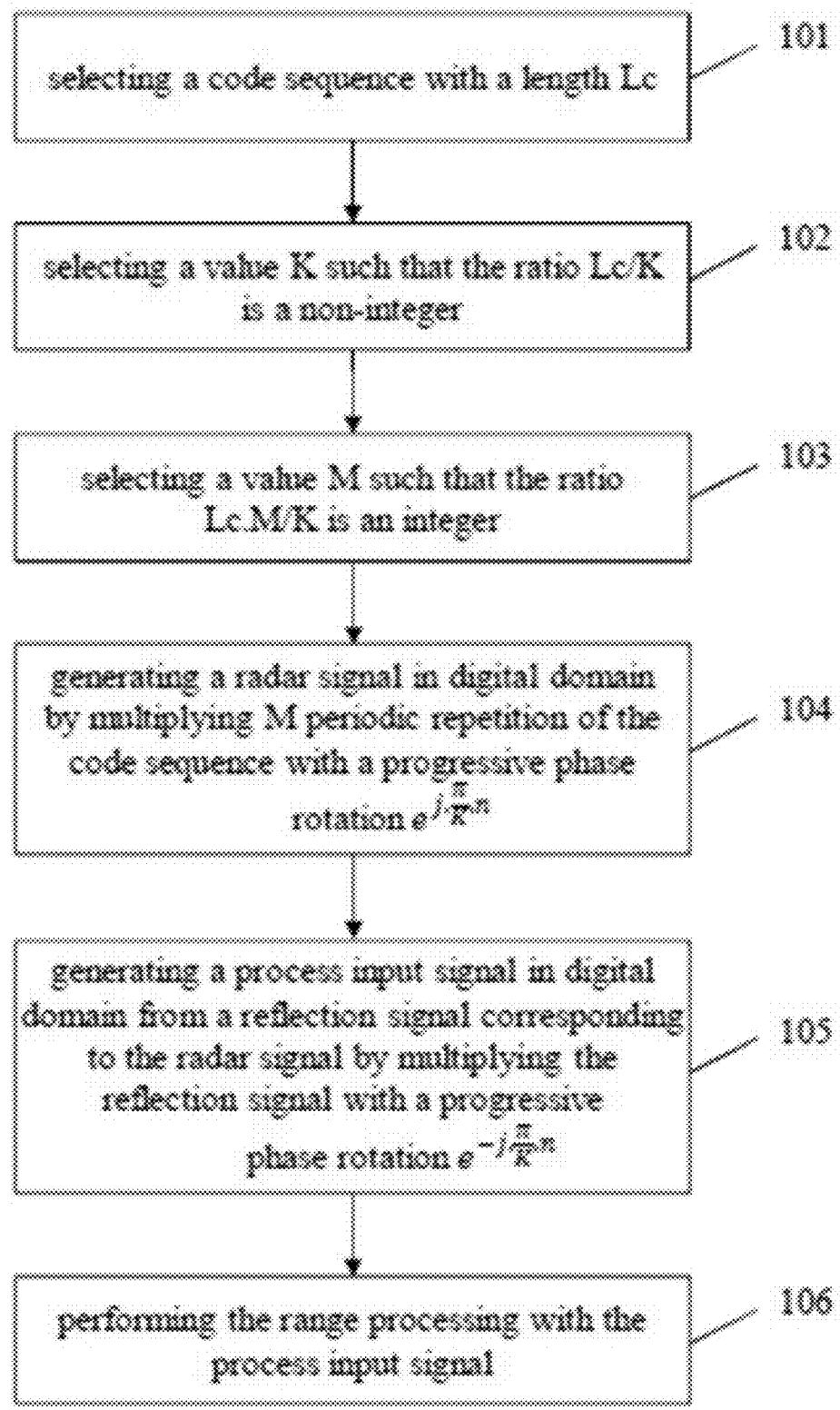
FIG. 1 is a block diagram of a method, according to an example.

In FIG. 1, an embodiment of the method according to the first aspect of the disclosure is illustrated. In a first step 101, a code sequence with a code sequence length Lc is selected. In a second step 102, a value for a parameter K is selected such that a ratio Lc/K is a non-integer. In a third step 103, a value for a parameter M is selected such that a ratio LcM/K is an integer. In a fourth step 104, a radar signal is generated in the digital domain by multiplying M periodic repetitions of the code sequence with a progressive phase rotation $$e^{j\frac{\pi}{K} \cdot n}.$$

In a fifth step 105, a process input signal is generated in the digital domain from a reflection signal corresponding to the radar signal by multiplying the reflection signal with a progressive phase rotation $$e^{-j\frac{\pi}{K} \cdot n}.$$

Finally, in a sixth step 106, range processing is performed with the process input signal.

The range processing comprises the generation of range profiles, Doppler profiles, and further the combination of the range and Doppler profiles that is referred to as a range-Doppler map. In this regard, the method comprises successive steps of correlating the process input signal with respect to the code sequence in order to generate a succession of range profiles and further accumulating M consecutive range profiles to improve SNR.

Figure 2:
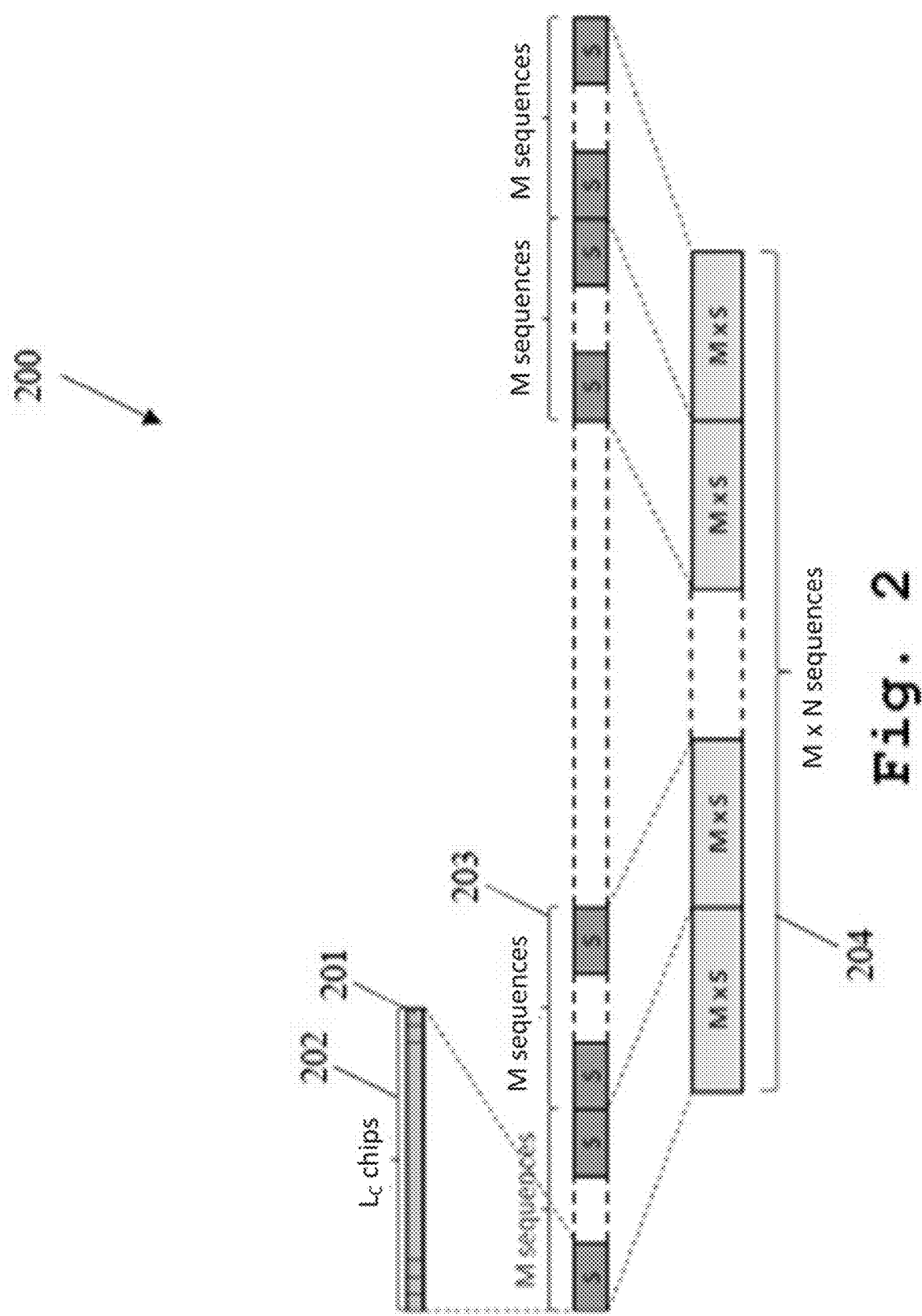
FIG. 2 shows a transmission frame for the acquisition of one radar data cube, according to an example.

In FIG. 2, a transmission frame 200 for the acquisition of one radar data cube is illustrated. The transmission frame 200 is shown as a conventional transmission frame for a single-input-single-output phase modulated continuous wave (SISO-PMCW) radar. The code sequence length Lc defines the number samples or chips 201 in the code sequence 202, denoted herein as "s". In other words, the code sequence length Lc defines the number of range bins for the range processing operation. Thus, the so-called pulse repetition frequency for a digitally modulated radar can be defined as the sequence of length Lc repeating itself with a chip rate fc, for example.

The parameter M defines the number of repetitions 203 of the same code sequence "s" that are accumulated, analogous to the conventional pseudorandom code sequences such as the maximum length sequence (MLS). In other words, the number of repetition M defines the number of range profiles to be coherently accumulated. The parameter N defines the number of repetitions 204 of M sequences 203, i.e. the number of samples for Doppler processing in order to estimate the target velocity. Therefore, the code sequence "s" is repeated M×N times in the transmission frame 200 for the acquisition of one radar data cube.

During the detection phase, the transmission signal is reflected from all targets or obstacles in front of the radar. This produces a linear combination of delayed version of the code sequence "s." This delay is proportional to the target range location. In order to estimate the delay, the received signal is correlated with the transmitted code sequence "s," e.g. for binary code sequence, or with the complex conjugate of the transmitted code sequence "s," e.g. for complex code sequence. This produces a range profile that contains a peak at the location of each target, which is proportional to the power reflected back from the targets.

Figure 3A:
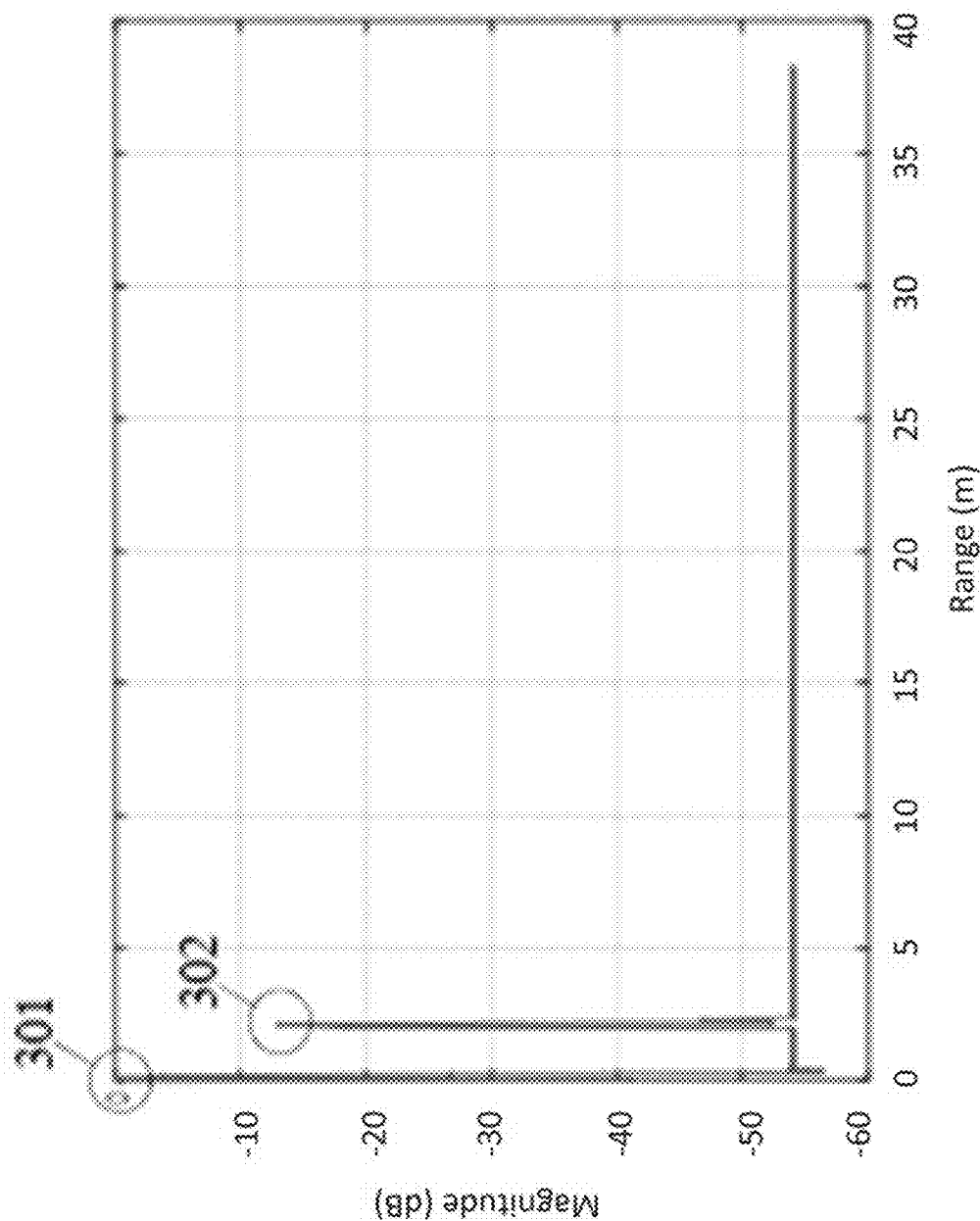
FIG. 3A shows an ideal M-sequence range profile with two targets, according to an example.
Figure 3B:
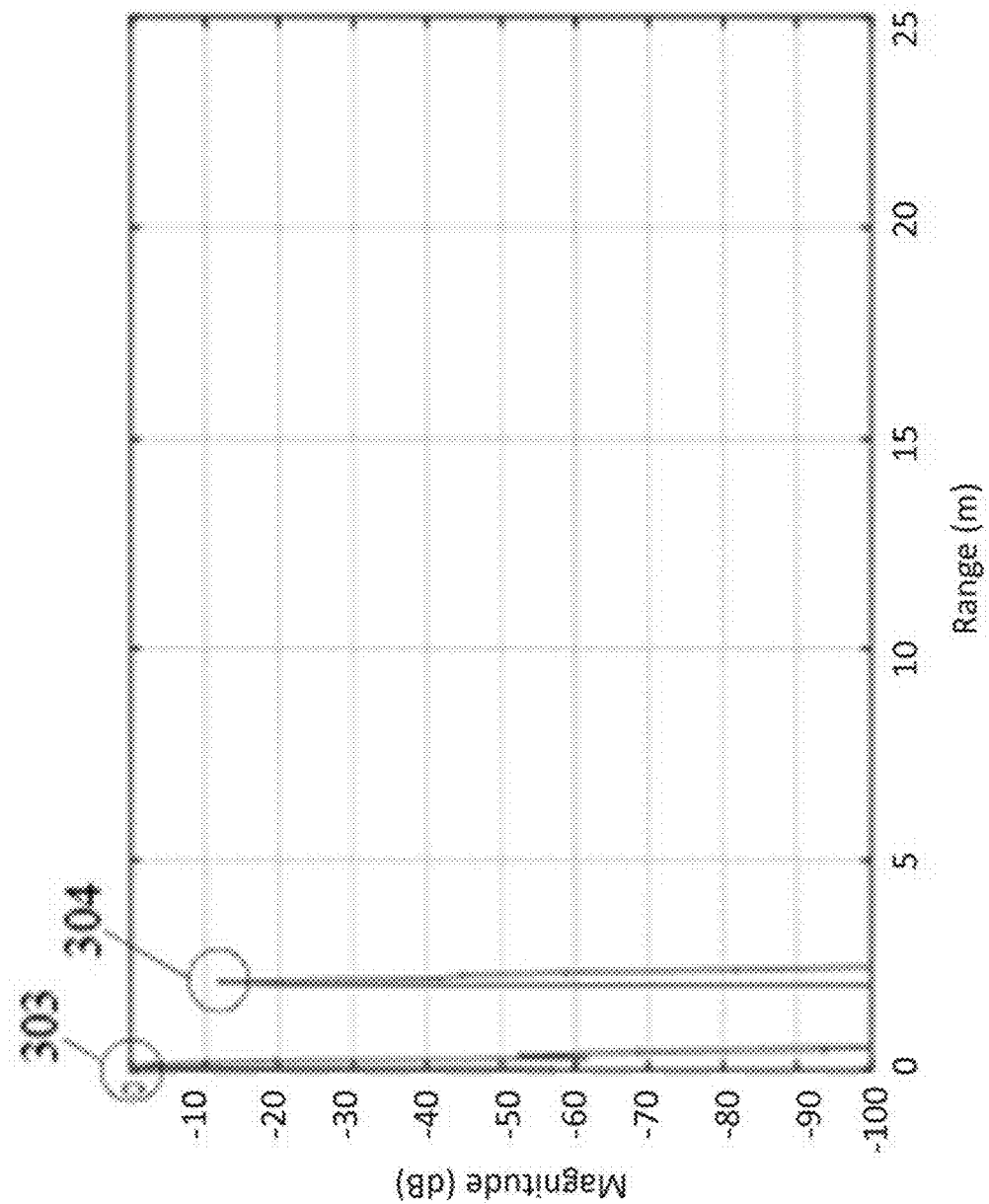
FIG. 3B shows an ideal APS range profile with two targets, according to an example.

In FIGS. 3A and 3B, range profiles are illustrated for an ideal radar transceiver. In particular. FIG. 3A shows an ideal range profile with two targets for M-sequence (MLS). The horizontal axis denotes the range of the targets in meters and the vertical axis denotes the reflected power magnitude in decibels. Here, the two targets are indicated at the respective peaks with circles 301 and 302. Whereas, FIG. 3B shows an ideal range profile with two targets for almost perfect sequence (APS). The horizontal axis denotes the range of the targets in meters and the vertical axis denotes the reflected power magnitude in decibels. Here, the two targets are indicated at the respective peaks with circles 303 and 304.

Ideally, the output of the correlator should contain zeros in the range bins, which do not correspond to any target. In practice, some non-null value may appear coining from the code sequence property. Those values are called range sidelobes. For example, an M-sequence always produces range sidelobes which are −20 log$_{10}$(Lc) dB below the correlation peak where Lc is the code sequence length, as shown in FIG. 3A. On the other hand, an APS does not produce any sidelobes, as shown in FIG. 3B. An ideal code sequence should have the following property:

$$\sum_{n=0}^{L_c-1} b_c(n)b_c(n+\Delta) = \begin{cases} L_c & \Delta = 0 \\ 0 & \Delta \neq 0 \end{cases} \quad (1)$$

for BPSK code sequence, or $$\sum_{n=0}^{L_c-1} b_c(n)b_c^*(n+\Delta) = \begin{cases} L_c & \Delta = 0 \\ 0 & \Delta \neq 0 \end{cases} \quad (2)$$

for complex code sequence, where $b_c(n)$ is the code sequence in digital domain, $\Delta$ is a circular shift in the code sequence which correspond to the target range and ( )* is the complex conjugate operation.

As already mentioned above, M consecutive range profiles are accumulated to improve the SNR, while the Doppler processing is achieved by Discrete Fourier Transforms (DFT) along the slow time, i.e. N repetitions of M code sequences. If multiple antennas are used, angular processing with conventional beamforming or multi-input multi-output (MIMO) can also be applied. With an ideal transceiver, the response to a point target creates a sharp peak in the range, range-Doppler, or range-Doppler-angle domain, possibly limited by the theoretical sidelobes of the waveform sequence. However, with a non-ideal transceiver, the ideal response is degraded, which typically manifests itself by the appearance of ghost targets or an increase in the sidelobes. Typical sources of non-idealities are power amplifier non-linearity or IQ mismatch.

The choice of sequence "s" depends on the type of digitally modulated radar, such as a phase modulated continuous wave (PMCW) based radar or an orthogonal frequency division modulation (OFDM) based radar.

In the case of PMCW radar, the range processing is performed with the help of correlation. Therefore, the code sequence selection depends on the periodic auto-correlation property of the code sequence as defined in equations (1) and (2). Hence, the code sequences that satisfy the above-mentioned auto-correlation property are selected. In this regard, APS and M-sequences are exemplified in this description, which perfectly satisfies the above-mentioned auto-correlation property. Particularly, APS produces two non-zero values in the range profile instead of only one non-null value and M-sequences give the value 1 instead of 0 when $\Delta \neq 0$.

In the case of OFDM radar, the range processing is performed with a similar processing as channel equalization in wireless communication. This operation extracts the range profile and removes the code sequence itself. Therefore, every sequence of Lc complex samples can be used and hence, there is no constraint on the value of the complex samples. The disclosure can address the aforementioned non-idealities and facilitates radar detection robust to the non-idealities, and can be implemented irrespective of the code sequence selection as well as the type of digitally modulated radar.

Figure 4:
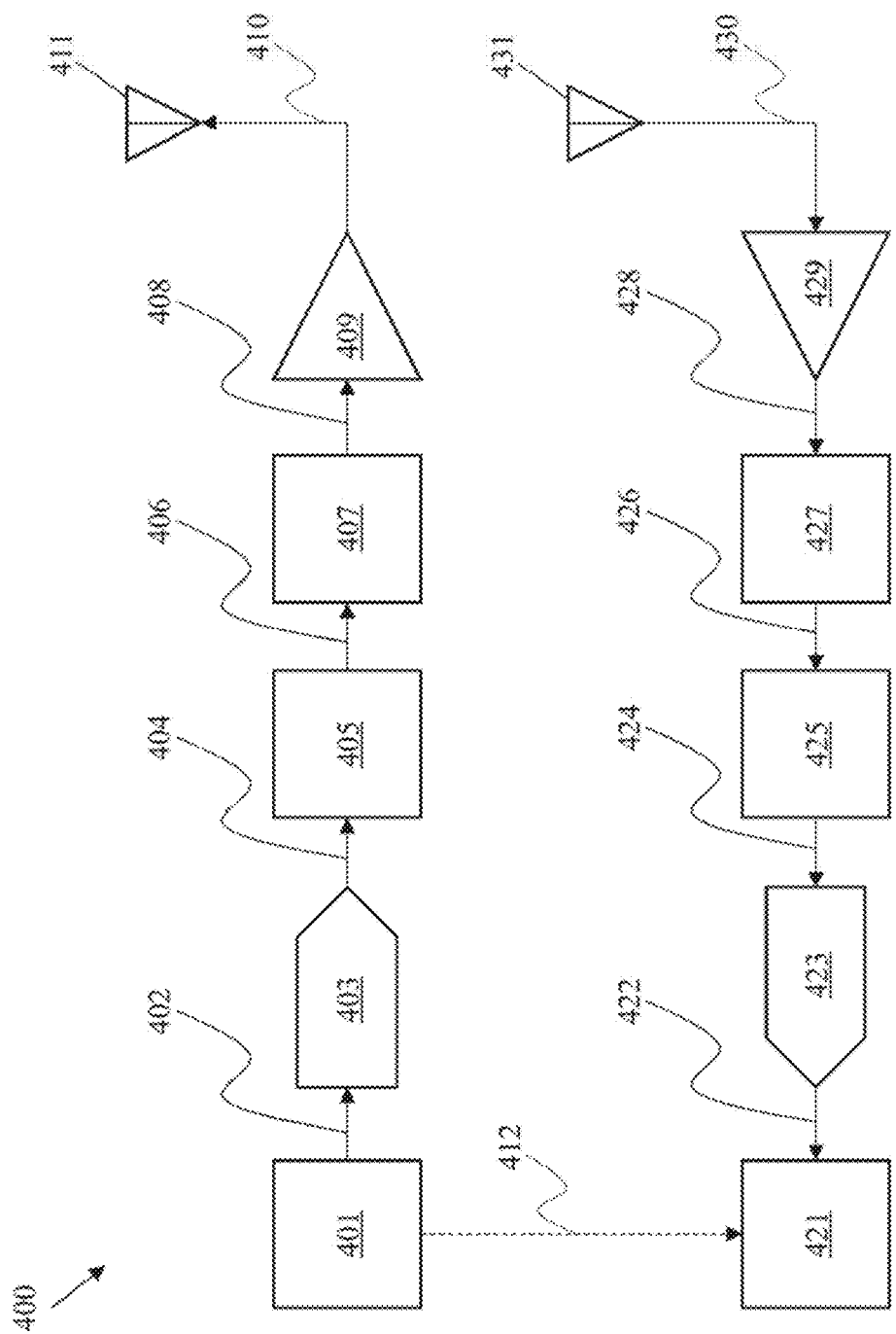
FIG. 4 shows a digitally modulated radar, according to an example.

In FIG. 4, an embodiment of the digitally modulated radar 400 according to the second aspect of the disclosure is illustrated. The digitally modulated radar 400 comprises a code generation unit 401 that generates a radar signal 402 in digital domain. A digital-to-analog converter (DAC) 403 downstream of the code generation unit 401 converts the digital radar signal 402 to the analog domain thereby generating an analog radar signal 404. A low pass filter (LPF) 405 downstream of the DAC 403 performs baseband filtration of the analog radar signal 404, i.e. filtering out higher frequency components, thereby generating a filtered radar signal 406.

A frequency mixer 407 downstream of the LPF 405 modulates the filtered radar signal 406 with a carrier sinewave, for example generated by a local oscillator (not shown), thereby generating an RF radar signal 408. An amplifier, especially a power amplifier (PA) 409 amplifies the RF radar signal 408, thereby generating a radar transmit signal 410, which is transmitted via a transmitter antenna 411. Therefore, the transmission path for transmitting the radar signal 402 is composed of the DAC 403, the LPF 405, the frequency mixer 407, the PA 409, and the transmitter antenna 411.

The radar transmit signal 410 is normally reflected from all targets and the resulting echo or reflected signal or radar receive signal 430 is received by a receiver antenna 431. Generally, only a portion of the transmit signal 410 is reflected back to the receiver antenna 431. An amplifier, especially a low noise amplifier (LNA) 429 amplifies the radar receive signal 430, thereby generating an amplified radar receive signal 428. A frequency mixer 427 downstream of the LNA 429 demodulates the amplified radar receive signal 428 with the carrier signal generated by the local oscillator, i.e. direct conversion of the amplified radar receive signal 428, thereby generating a baseband signal 426.

A low pass filter (LPF) 425 downstream of the frequency mixer 427 filters the baseband signal 426, thereby generates a filtered baseband signal 424. An analog-to-digital converter (ADC) 423 downstream of the LPF 425 converts the filtered baseband signal 424 into the digital domain, thereby generating a reflection signal 422 in the digital domain corresponding to the radar signal 402 generated by the code generation unit 401 in digital domain. The digitally modulated radar 400 further comprises a processing unit 421 that generates a process input signal in digital domain from the reflection signal 422 in order to perform range and Doppler processing. Therefore, the reception path for receiving the reflection signal 422 is composed of the LNA 429, the frequency mixer 427, the LPF 425, the ADC 423, and the receiver antenna 431.

It can be understood that the transmitter antenna 411 and the receiver antenna 431 can be implemented as dedicated antennas of antenna array for the respective transmission path and the reception path of the digitally modulated radar 400. It is further conceivable that the transmitter antenna 411 and the receiver antenna 431 can be implemented in a single antenna array and the antenna array may be operable in a switching manner, e.g. antenna switching or circulators, for the transmission path and the reception path of the digitally modulated radar 400.

The code generation unit 401 is further configured to communicate with the processing unit 421, in order to provide information regarding the selected code sequence for correlation. The communication signal is shown as a dashed line 412. It is conceivable that the code generation unit 401 and the processing unit 421 can be implemented as a single entity, e.g. as a baseband processing unit. Furthermore, additional means for generating and/or processing radar signals, e.g. memory or storage for storing code sequences, control commands etc. as well as interfaces such as a user interface, are not explicitly shown but are apparent from the above-described implementation.

Because of the non-ideality of the frequency mixers 407 and 427, the I and Q components are not identical and hence a mismatch between the I and Q components arises, which is referred to as IQ imbalance. Generally, the non-ideality of the frequency mixer 407 introduces IQ imbalance that results in range sidelobes or ghosts, e.g. in the radar range-Doppler maps. Furthermore, the non-ideality of the frequency mixer 427 also introduces IQ imbalance in the baseband signal. Due to the aforementioned effects, the resulting radar range profiles may contain significant range sidelobes. In addition, the non-linearity of the PA 409 further degrades the radar performance by producing range sidelobes or ghosts, e.g. in the radar range-Doppler maps.

Figure 5A:
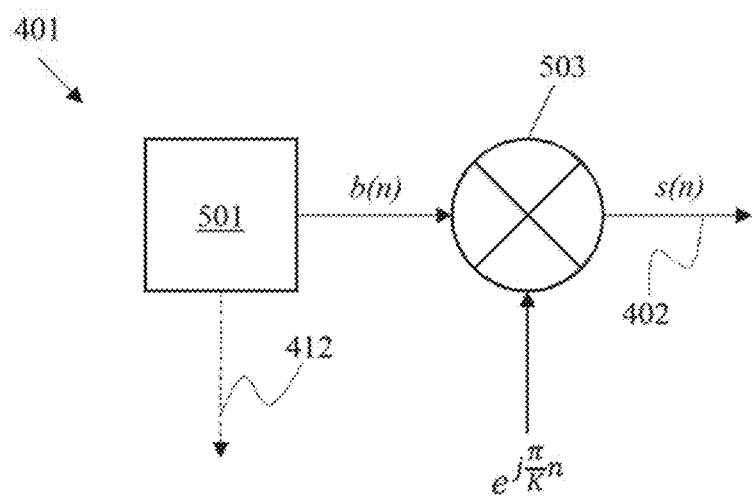
FIG. 5A shows the code generation unit of FIG. 4 in detail, according to an example.
Figure 5B:
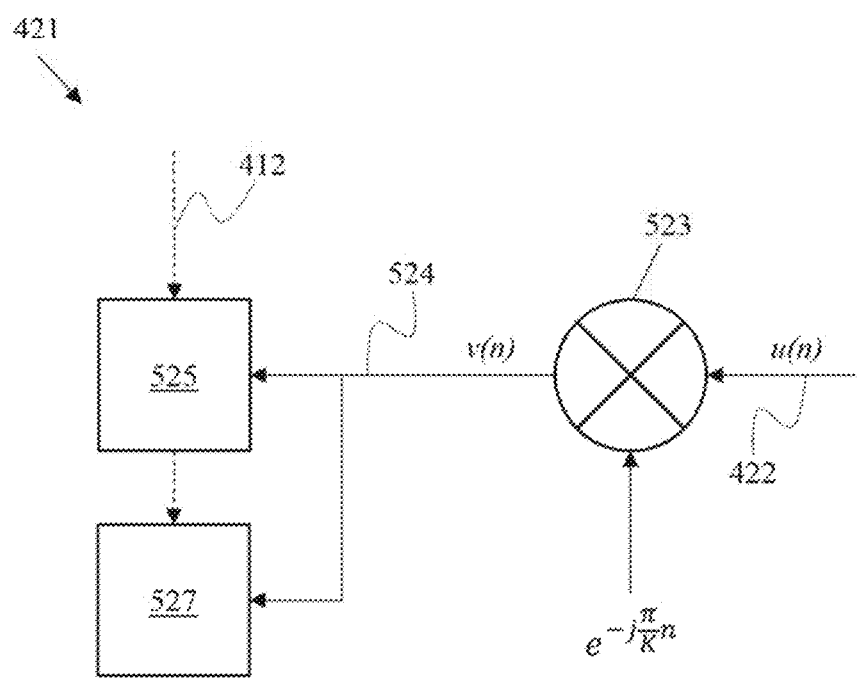
FIG. 5B shows the processing unit of FIG. 4 in detail, according to an example.

In FIG. 5A and FIG. 5B, the generation of the radar signal 402 in the code generation unit 401 and the generation of the process input signal 524 in the code generation unit 421 are shown in detail. The code generation unit 401 of FIG. 5A comprises a signal generator 501 that generates chip signals or chips according to a predefined code sequence. Such a code sequence may correspond to the transmission frame as shown in FIG. 2, that comprises a sequence "s" of Lc chips, which is repeated M times, and eventually the M repetition of the "s" is further repeated N times. In other words, the sequence "s" is repeated M×N times in a single transmission frame.

Here, the code sequence is shown as $b_c(n)$, where n defines a discrete time index that corresponds to the code rate. In conventional digitally modulated radars, the code sequence $b_c(n)$ is repeatedly transmitted as the radar signal, i.e. the repeated code sequence $b_c(n)$ is used directly for the successive conversion, filtration, and amplification stages. However, in order to generate the radar signal robust to non-idealities according to the disclosure presented herein, the code generation unit 401 further comprises a multiplier 503 that multiplies the periodic repetition of $b_c(n)$, herein shown as b(n), with a progressive phase rotation $$e^{j \cdot \frac{\pi}{K} \cdot n}.$$

Therefore, the radar signal 402 in terms of the digital code sequence can be expressed as:

$$s(n) = b(n) e^{j \frac{\pi}{K} n} \qquad (3)$$

where b(n) is a periodic repetition of the code sequence $b_c(n)$.

On the other hand, the processing unit 421 receives the reflected signal 422, herein shown as u(n), after baseband conversion as described along FIG. 4. The processing unit 421 comprises a multiplier 523 that multiplies the reflected signal u(n) with a progressive phase rotation $$e^{-j \cdot \frac{\pi}{K} \cdot n}.$$

This results in the process input signal 524, herein shown as v(n), which is utilized for subsequent processing. Therefore, the process input signal v(n) can be expressed as:

$$v(n) = u(n) e^{-j \frac{\pi}{K} n} \qquad (4)$$

It can be seen that the progressive phase rotation for the reception signal has an opposite rotational angle than the progressive phase rotation for the transmission signal. Hence, the multiplier 523 effectively removes the complex exponential.

The processing unit 421 further comprises a process block 525 that correlates the process input signal 524 with respect to the code sequence $b_c(n)$, e.g. with the help of code sequence information 412 fed from the code generation unit 401, for example the signal generator 501, thereby performing range processing in order to generate radar range profiles. The process block 525 further accumulates M consecutive range profiles in order to remove range sidelobes coming from IQ imbalance, which will be described in detail below. The accumulation of M consecutive profiles further improves SNR, for instance. The processing unit 421 further comprises a discrete Fourier transformation (DFT) block 527 that performs DFT on N number of samples in order to produce Doppler profiles.

In the following, the criteria for the parameters Lc, K, and M and their effect on range sidelobe reduction, for example due to IQ imbalance, are described in detail.

The reflection signal 422 can be described in the time domain as:

$$u(t) = \alpha y(t) + \beta y^*(t) \qquad (5)$$

Hence, for the ideal case, i.e. when there is no mismatch or imbalance between the I and Q branches, $\alpha=1$ and $\beta=0$.

Therefore, an IQ mismatch on the transmission path and/or the reception path will produce range sidelobes such as:

$$v(n) = u(n) e^{-j \frac{\pi}{K} n} = b(n+\Delta) \left[ \alpha e^{j \frac{\pi}{K} \Delta} + \beta e^{-j2\pi \frac{n}{K}} e^{-j \frac{\pi}{K} \Delta} \right] \qquad (6)$$

where $\Delta$ is the propagation delay.

In equation (6), the first term $$b(n+\Delta) \alpha e^{j \frac{\pi}{K} \Delta}$$

is a delayed version of the code sequence multiplied by a phase rotation which depends on the propagation delay $\Delta$. Therefore, the autocorrelation properties of the code sequence are not affected.

However, the second term $$b(n+\Delta) \beta e^{-j2\pi \frac{n}{K}} e^{-j \frac{\pi}{K} \Delta}$$

is also a delayed version of the code sequence multiplied by a phase rotation. In addition, this term also contains a progressive phase rotation $$e^{-j2\pi \frac{n}{K}}.$$

This progressive phase rotation breaks the correlation property of the code sequence. This will result in range sidelobes.

However, with selection criteria for K, the progressive phase rotation will be mitigated during the radar digital processing chain.

For example, the first three range profiles can be expressed as:

$$r_1(D) = \sum_{n=0}^{Lc-1} v(n)b_c(n+D) \quad (7a)$$

$$r_2(D) = \sum_{n=0}^{Lc-1} v(n+Lc)b_c(n+D) \quad (7b)$$

$$r_3(D) = \sum_{n=0}^{Lc-1} v(n+2Lc)b_c(n+D) \quad (7c)$$

where D is a circular shift in the code sequence $b_c(n)$.

Each range profile $r_k(D)$ is affected by range sidelobes. This can be described as:

$$r_{sl,k}(D) = \sum_{n=0}^{Lc-1} b(n+(k-1)Lc+\Delta)\beta e^{-j2\pi\frac{(n+(k-1)Lc)}{K}} e^{-j\frac{\pi}{K}\Delta} b_c(n+D) \quad (8)$$

where $r_{sl,k}(D)$ contains the range sidelobes from $r_k(D)$. The equation (8) can be rewritten as:

$$r_{sl,k}(D) = \beta e^{-j2\pi\frac{(k-1)Lc}{K}} e^{-j\frac{\pi}{K}\Delta} \sum_{n=0}^{Lc-1} b_c(n+\Delta)b_c(n+D)e^{-j2\pi\frac{n}{K}} \quad (9)$$

since b(n) is a periodic repetition of $b_c(n)$ that contains Lc samples.

It can be seen that all range profiles will have the same range sidelobes as:

$$r_{sl,k}(D) = \beta e^{-j\frac{\pi}{K}\Delta} \sum_{n=0}^{Lc-1} b(n+\Delta)b_c(n+D)e^{-j2\pi\frac{n}{K}} \quad (10)$$

which is multiplied by a phase rotation $$e^{-j2\pi\frac{(k-1)Lc}{K}}$$

depending on the range profile index. Therefore, the equation (9) can be written in a simplified form as:

$$r_{sl,k}(D) = e^{-j2\pi\frac{(k-1)Lc}{K}} r_{sl}(D) \quad (11)$$

From the equation (11), it can be summarized that, if Lc is not a multiple of K, the range sidelobe in consecutive range profiles are not in phase and therefore will be attenuated during accumulation.

Furthermore, it can be summarized from equation (11) that, if LcM/K is an integer, the phase of the range sidelobes at index D in all M range profiles are equally distributed on the complex circle. Consequently, the accumulation of M consecutive range profiles cancels the range sidelobes as shown in the following equation:

$$\sum_{k=1}^{M} r_{sl,k}(D) = r_{sl}(D) \sum_{k=1}^{M} e^{-j2\pi\frac{(k-1)Lc}{K}} = 0 \quad (12)$$

This can also be extended to complex code sequences as well as OFDM radars as they transmit complex digitally modulated signals. Especially for complex code sequence, it can be seen that the ghosts are represented by $$b^*(n+\Delta)\beta e^{-j2\pi\frac{n}{K}} e^{-j\frac{\pi}{K}\Delta},$$

analogous to equation (6) but with complex operator ( )*, i.e. the complex conjugate of the code sequence. However, they are affected by the same phase rotation as a function of K. Therefore, the disclosure can also be used to effectively compensate the range sidelobes produced by IQ imbalance (on the transmitter and receiver side) with complex code sequences.

In the following, the criteria for the parameter K and its effect on range sidelobe reduction, for example due to power amplifier non-linearity, are described in detail. The following technique is performed for binary code sequence, e.g. implemented in binary phase modulated radars such as PMCW radars.

One way to implement a low complexity PMCW radar is to use BPSK modulation. In that way, the modulation signal is only a {−1; +1} code sequence. This results in a binary phase modulated radar. In addition to this low complexity, the BPSK modulation also shows low Peak-to-Average Power Ratio (PAPR). Ideally, the PAPR should be 0 dB (constant magnitude). However, because the transmitter bandwidth is limited, the transition from a +1 to a −1 is not instantaneous and the waveform exhibits a non-constant magnitude which makes the waveform sensitive against non-linear distortions introduced in the power amplifier. This PAPR degradation may also come from the pulse shaping operation required to fit with a specific spectrum mask. This phenomenon produces undesired artifacts, called range sidelobes or ghosts, in the range profile.

Consider the code sequence b(n) as a binary code sequence, which is multiplied by the complex exponential with progressive phase rotation in the digital domain, as described above. This produces the radar signal s(n) as shown in equation (3). The radar signal is then converted to the analog domain and modulates the carrier sinewave.

Generally, the transmission is bandwidth limited, which can be modeled with the LPF 405 with an impulse response h(n). The signal is, then, amplified through the PA 409. In order to reduce the power consumption for radar signal transmission, the PA 409 is for example operated close to its saturation point. However, this produces non-linear distortion in the transmitted signal, which degrades the radar performances.

The disclosure implements a different technique, i.e. a technique aside from creating a waveform with low PAPR. The proposed technique creates a waveform that is able to cancel the most significant sources of range sidelobes. For that reason, the following two hypotheses are developed:

1) The power amplifier non-linear model can be approximated with a cubic model:

$$y(n) = a_0 x(n) + a_3 x(n)|x(n)|^2 \quad (13)$$

where $a_0$ is the power amplifier linear gain (positive real value) and $a_3$ is the $3^{rd}$ order non-linearity (negative real value).

This hypothesis is met in practice as the even non-idealities are absent in the baseband power amplifier model and the $3^{rd}$ order non-linearity is dominating in practice.

2) Only three taps in the LPF discrete impulse response are significant:

$$x(n) = \sum_{k=0}^{2} h(k)s(n-k) \quad (14)$$

As h(n) is a low-pass filter, this assumption is realistic. However, if there are more than three taps in the filter discrete impulse response, the non-linear distortions resulting from the additional taps (combined with power amplifier non-linearity) will be partially compensated. In other words, the hypothesis is developed to remove the sidelobes and ghosts resulting from the three most significant taps and therefore removes the most significant part of the range sidelobes and ghosts.

The process input signal v(n) contains several terms that are linear combinations of the binary code sequence b(n), which depend on the targets' location and contain useful information. Other terms depend on non-linear combinations of b(n). The non-linear combinations will produce range sidelobes or ghosts in the range profile. However, for every case, the non-linear combinations are all multiplied by:

$$z(K) = 2\cos\left(\frac{\pi}{K}\right) + e^{-j3\frac{\pi}{K}} \quad (15)$$

The values of K for which z(K)=0 will not produce any range sidelobes and ghosts. At least, the ones produced by the three most significant taps of the impulse response h(n) and the 3rd order non-linearity are cancelled due to the waveform property.

Figure 6:
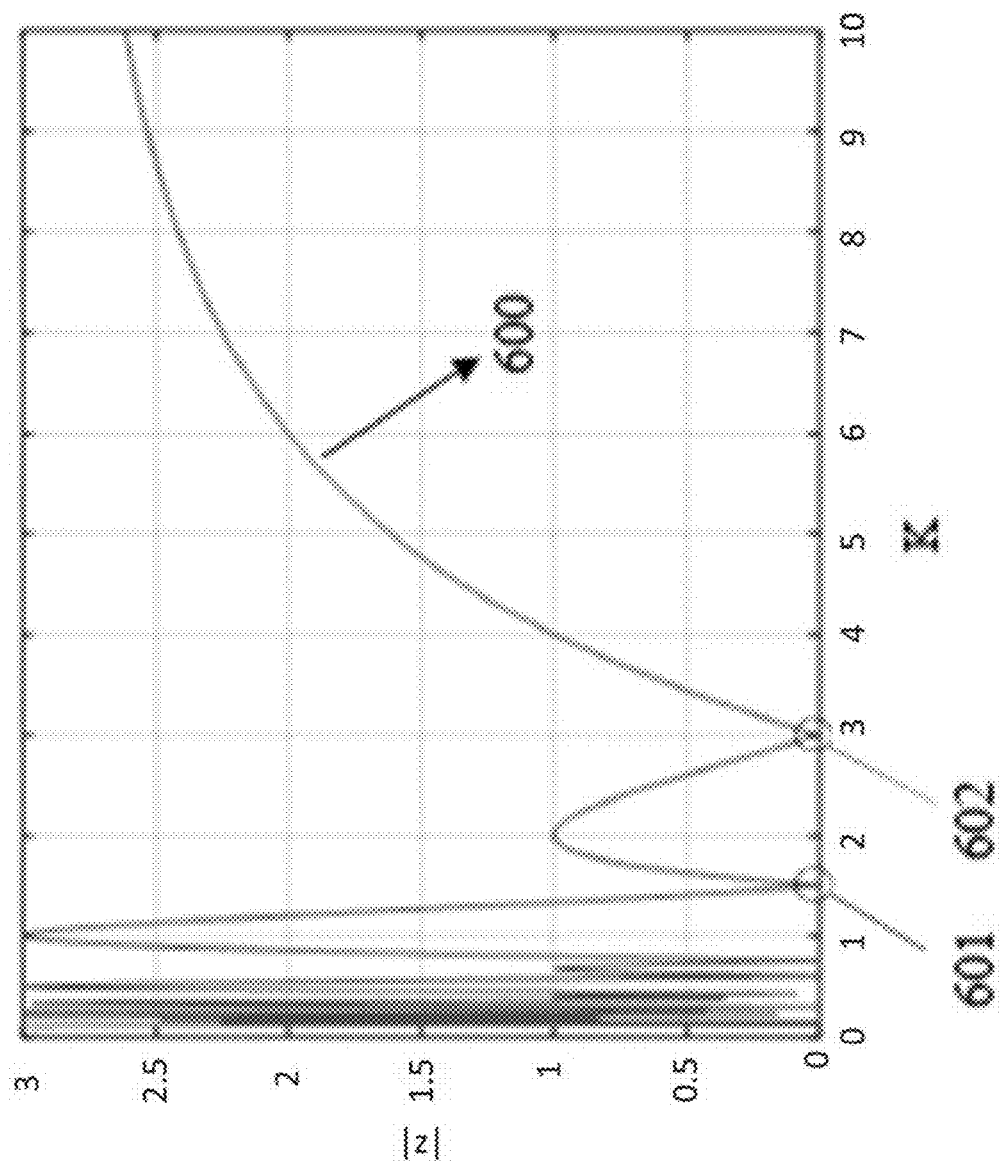
FIG. 6 shows magnitudes of z as a function of K, according to an example.

In FIG. 6, magnitudes of z as a function of K 600 are illustrated. The horizontal axis defines the values for K and the vertical axis defines the magnitude |z|. It can be seen that, for instance, at points 601 and 602, the magnitude of z as a function of K 600 reaches zero. For this example, the values of K that makes |z| zero are 1.5 and 3 at points 601 and 602, respectively. Therefore, values of K such as 3 or 1.5 give no range sidelobes or ghosts while a value 2 for K gives larger range sidelobes and ghosts. From this illustration, the parameter K can be expressed in a simplified form such as:

$$K = \frac{\pm 3}{1+3d} \quad (16)$$

where d is an integer. Therefore, possible values of K can be approximated as: ±3, ±1.5, and so on.

Some combinations for the parameters Lc, K, and M are shown in the following table:

| Lc | M | K |
|---|---|---|
| 844 | 3 | 3 |
| 511 | 2 | 2 |
| 844 | 3 | 3 |
| 1023 | 2 | 2 |
| 1024 | 3 | 3 |

For instance, for a code sequence length Lc of 844, three consecutive range profiles, i.e. M, are needed to be accumulated and the value of K is needed to be defined as 3. This particular combination allows the generation of the radar signal robust to IQ imbalance, irrespective of the modulation technique of the digitally modulated radar. Furthermore, since the value of K is 3, which satisfies the criteria for binary code sequence as shown in equation (16), this combination further allows the generation of the radar signal robust to power amplifier non-linearity, for example for binary phase modulated radars.

In FIG. 7A, FIG. 7B, FIG. 7C, and FIG. 7D, range profiles for the APS code sequence with a code sequence length of 544 for different modulation techniques are illustrated.

Figure 7A:
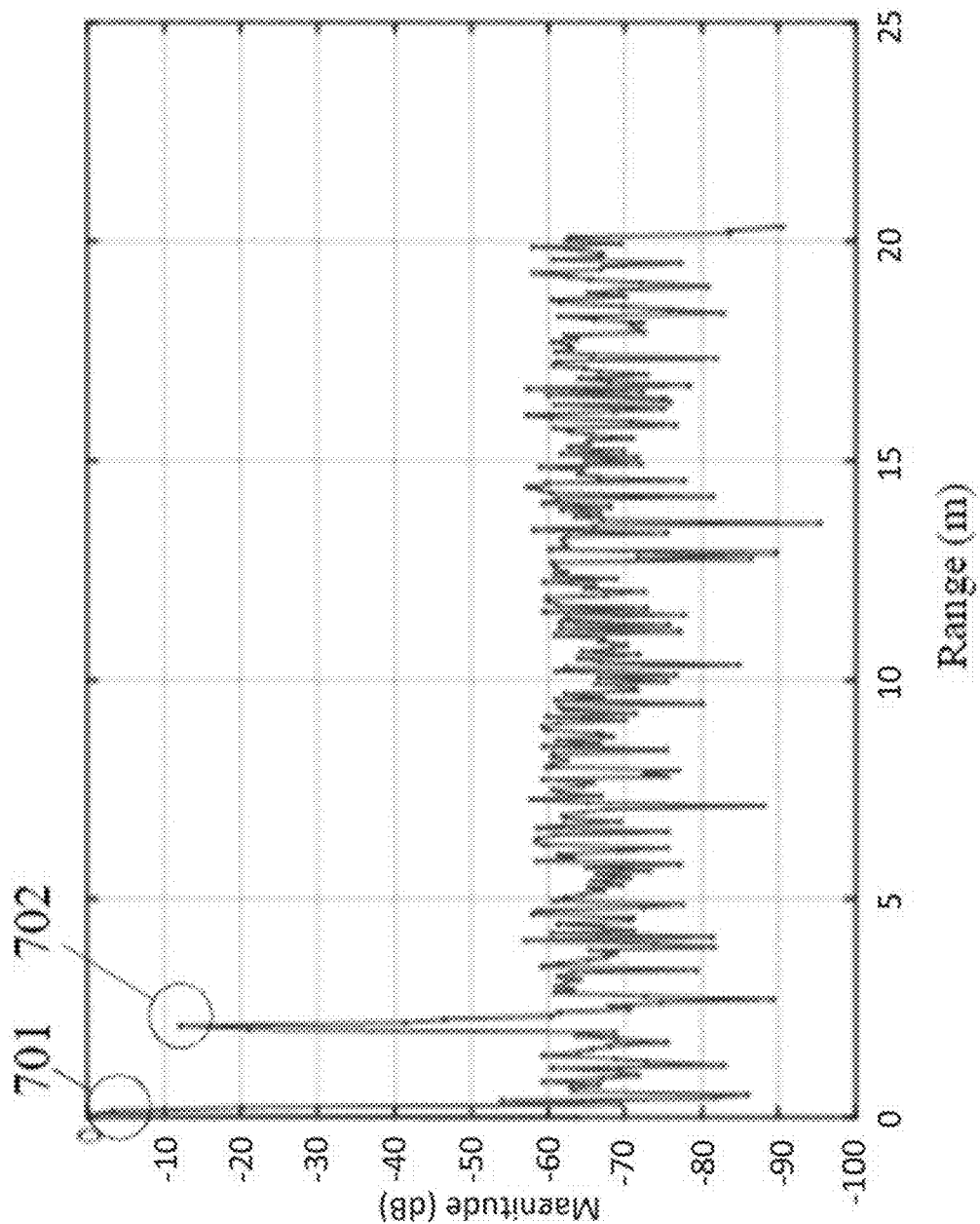
FIG. 7A shows an APS range profile after accumulation for a sequence length of 544 with BPSK modulation, according to an example.

FIG. 7A shows the range profile with two targets 701, 702 after accumulation, for example for the APS code sequence with a code sequence length 544 for binary phase shift keying (BPSK) modulation. The horizontal axis denotes the range of the targets 701, 702 in meters and the vertical axis denotes the reflected power magnitude in decibels. Here, the two targets are indicated at the respective peaks 701 and 702 with circles. The magnitude of the range sidelobes can be approximated around −60 dB.

Figure 7B:
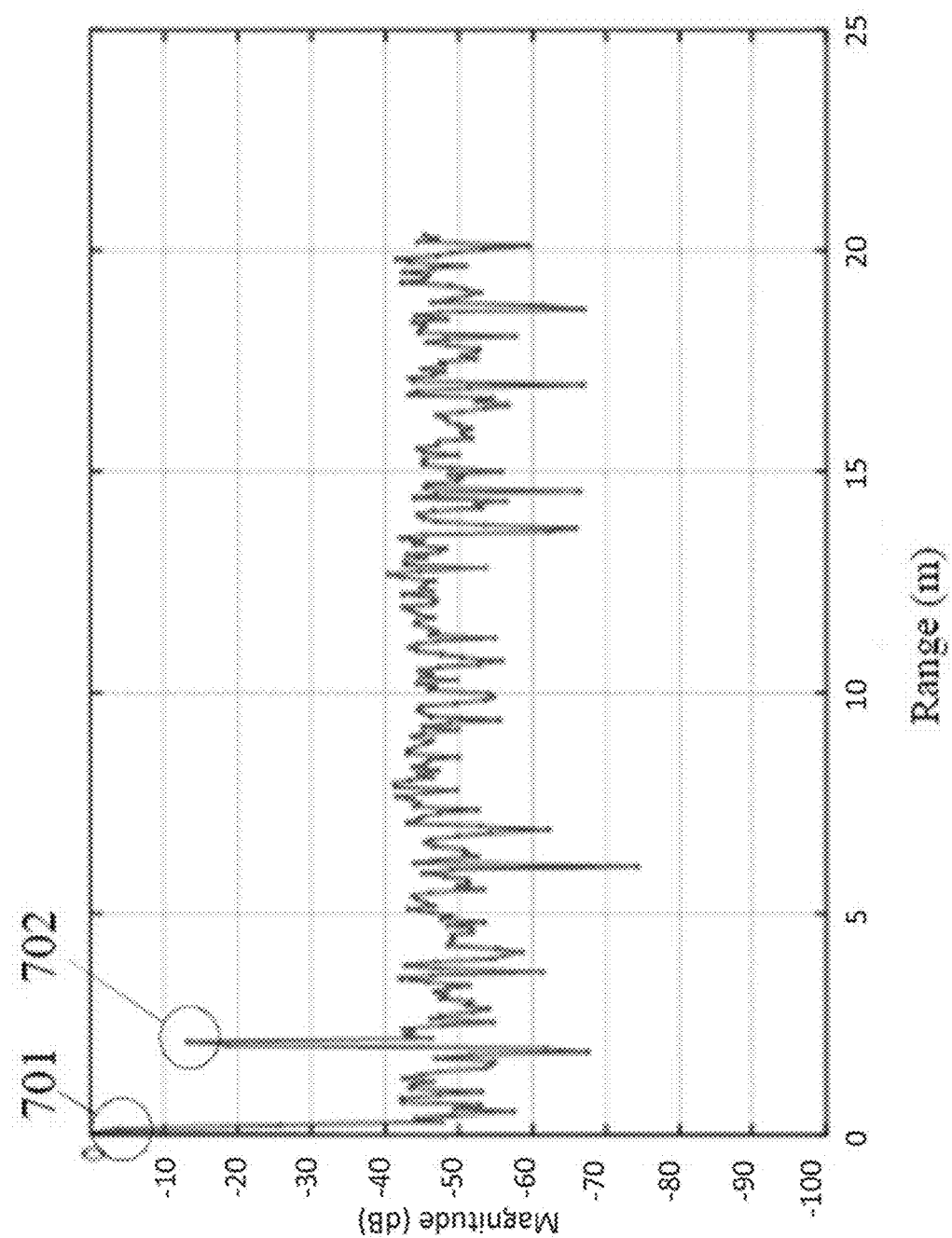
FIG. 7B shows an APS range profile after accumulation for a sequence length of 544 with MSK modulation, according to an example.

FIG. 7B shows the range profile with two targets 701, 702 after accumulation, for example for the APS code sequence with a code sequence length 544 for minimum shift keying (MSK) modulation. The horizontal axis denotes the range of the targets 701, 702 in meters and the vertical axis denotes the reflected power magnitude in decibels. Here, the two targets are indicated at the respective peaks 701 and 702 with circles. The magnitude of the range sidelobes can be approximated around −40 dB, i.e. approximately a 20 db increase in the sidelobe magnitude with respect to the technique of FIG. 7A.

FIG. 7C shows the range profile with two targets 701, 702 after accumulation, for example for the APS code sequence with a code sequence length 544 for pi/2 binary phase shift keying (π/2-BPSK) modulation. The horizontal axis denotes the range of the targets 701, 702 in meters and the vertical axis denotes the reflected power magnitude in decibels. Here, the two targets are indicated at the respective peaks 701 and 702 with circles. The magnitude of the range sidelobes can be approximated around −50 dB, i.e. approximately a 10 db increase in the sidelobe magnitude with respect to the technique of FIG. 7A and approximately 10 db decrease in the sidelobe magnitude with respect to the technique of FIG. 7B.

FIG. 7D shows the range profile with two targets 701, 702 after accumulation, for example for the APS code sequence with a code sequence length 544 according to the disclosure. Here, the value of K is selected as 3, the value of M is selected as 3, and is implemented with binary phase shift keying (π/3-BPSK) modulation. The horizontal axis denotes the range of the targets 701, 702 in meters and the vertical axis denotes the reflected power magnitude in decibels. Here, the two targets are indicated at the respective peaks 701 and 702 with circles. The magnitude of the range sidelobes can be approximated around −100 dB, which shows superior sidelobe suppression compared to the techniques illustrated in FIG. 7A, FIG. 7B, and FIG. 7C, i.e. sidelobe suppression is improved by approximately 40 dB, 60 dB and 50 dB, respectively.

It is to be noted that the range sidelobes at −100 dB results from additional taps, for example more than three taps of the low-pass filter as described before. If the low-pass filter only had three taps, no range sidelobes would be observed in the range profile shown in FIG. 7D. However, the disclosure demonstrates superior performance over the techniques illustrated by FIG. 7A, FIG. 7B, and FIG. 7C, since the sidelobes produced by the three most significant taps of the filter are suppressed.

In FIG. 8A, FIG. 8B, FIG. 8C, and FIG. 8D, range profiles for the M-sequence code sequence with a code sequence length of 511 for different modulation techniques are illustrated. For M-sequence, the range sidelobes come from the limitation of the code sequence itself, as it is known in the art that M-sequence produces ghost targets if they are affected by amplifier non-linearity.

Figure 8A:
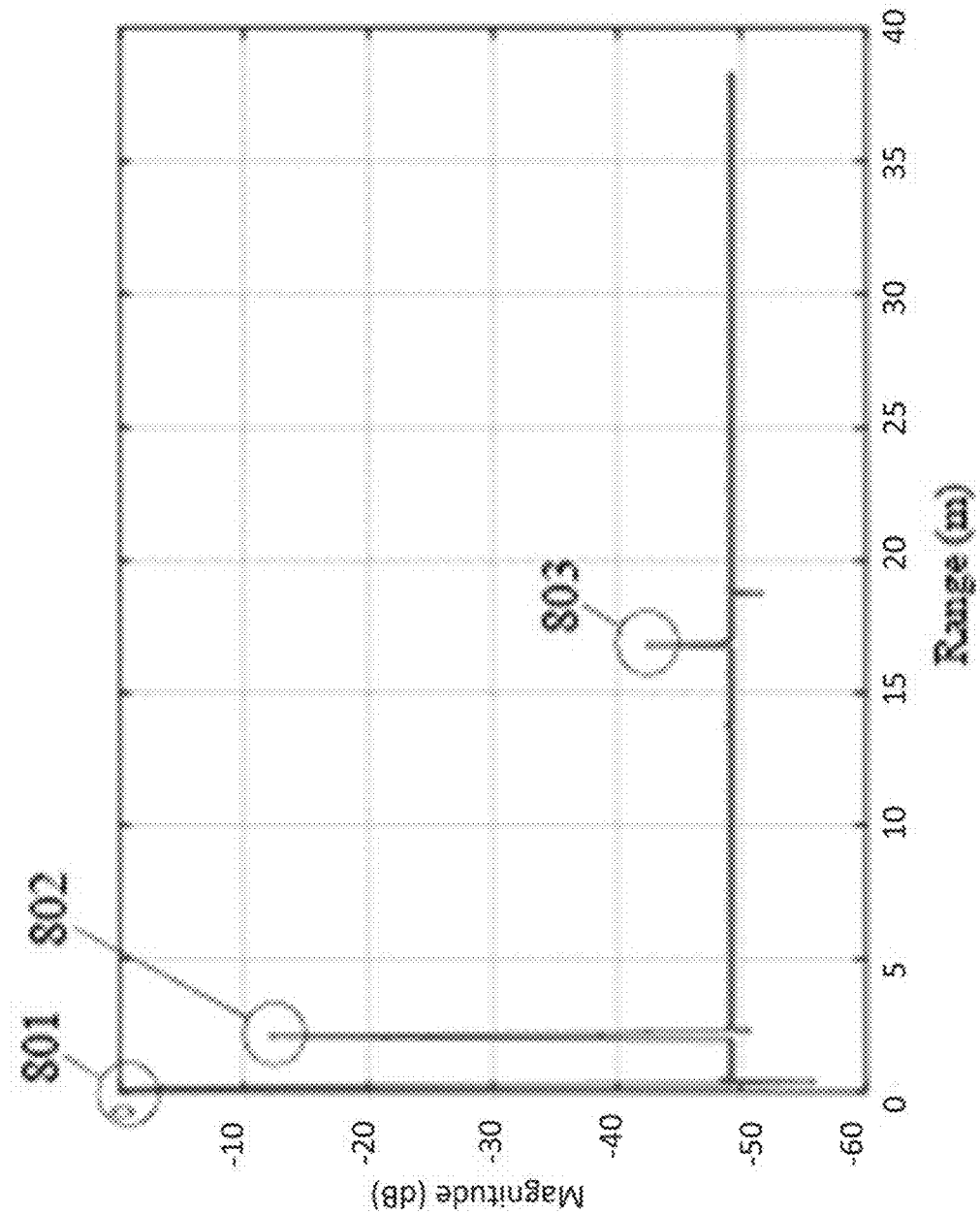
FIG. 8A shows an M-sequence range profile after accumulation for a sequence length of 511 with BPSK modulation, according to an example.

FIG. 8A shows the range profile with two targets 801, 802 after accumulation, especially for the M-sequence code sequence with a code sequence length 511 for binary phase shift keying (BPSK) modulation. The horizontal axis denotes the range of the targets 801, 802 in meters and the vertical axis denotes the reflected power magnitude in decibels. Here, the two targets are indicated at the respective peaks 801 and 802 with circles. The magnitude of the range sidelobes can be approximated around −50 dB. It can be further seen that this technique produces ghost targets as indicated at the peak 803.

FIG. 8B shows the range profile with two targets 801, 802 after accumulation, for the M-sequence code sequence with a code sequence length 511 for minimum shift keying (MSK) modulation. The horizontal axis denotes the range of the targets 801, 802 in meters and the vertical axis denotes the reflected power magnitude in decibels. Here, the two targets are indicated at the respective peaks 801 and 802 with circles. The magnitude of the range sidelobes can be approximated around −55 dB.

Figure 8C:
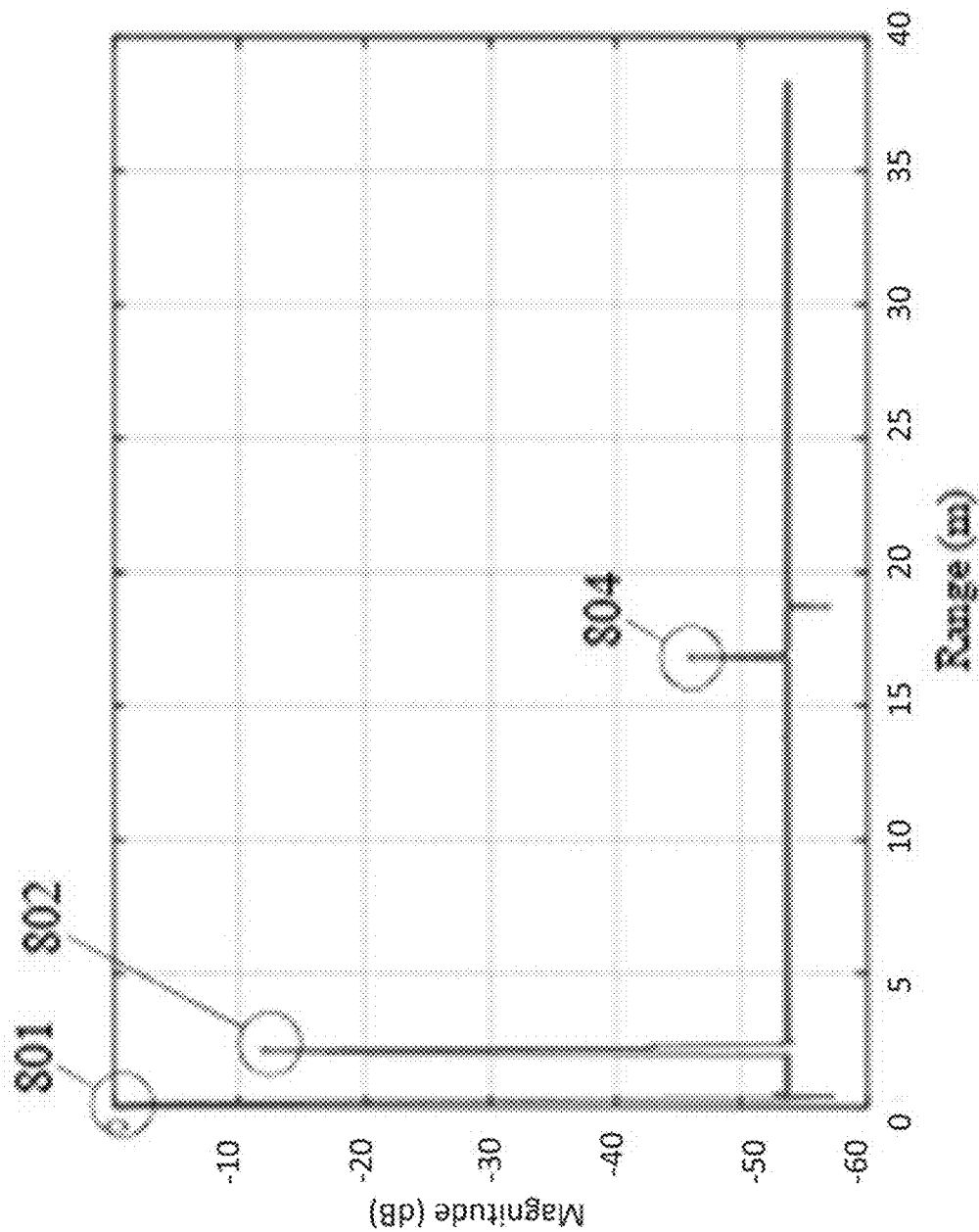
FIG. 8C shows an M-sequence range profile after accumulation for a sequence length of 511 with pi/2-BPSK modulation, according to an example.

FIG. 8C shows the range profile with two targets 801, 802 after accumulation, for the M-sequence code sequence with a code sequence length 511 for pi/2 binary phase shift keying ($\pi/2$-BPSK) modulation. The horizontal axis denotes the range of the targets 801, 802 in meters and the vertical axis denotes the reflected power magnitude in decibels. Here, the two targets are indicated at the respective peaks 801 and 802 with circles. The magnitude of the range sidelobes can be approximated around −55 dB, however affected by amplifier non-linearity and producing ghost targets as indicated at the peak 804.

Figure 8D:
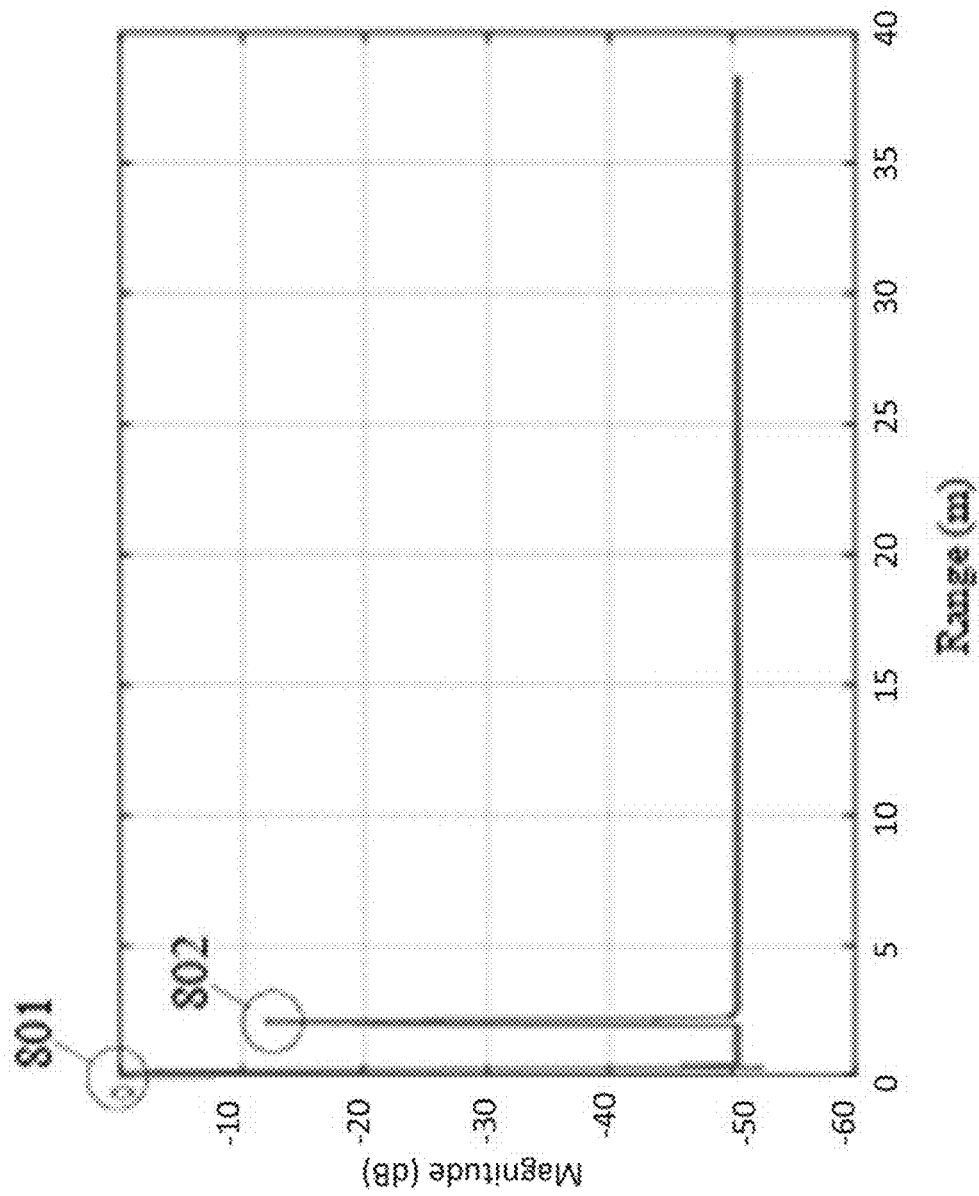
FIG. 8D shows an M-sequence range profile after accumulation for a sequence length of 511 with pi/3-BPSK modulation, according to an example.

FIG. 8D shows the range profile with two targets 801, 802 after accumulation, for the M-sequence code sequence with a code sequence length 511 according to the disclosure. Here, the value of K is selected as 3, the value of M is selected as 3, and is implemented with binary phase shift keying ($\pi/3$-BPSK) modulation. The horizontal axis denotes the range of the targets 801, 802 in meters and the vertical axis denotes the reflected power magnitude in decibels. Here, the two targets are indicated at the respective peaks 801 and 802 with circles. The magnitude of the range sidelobes can be approximated as −50 dB, and no ghost targets are present, which indicates the robustness to amplifier non-linearity.

Hence, it can be seen that for odd length code sequences (e.g. 511), for example, a $\pi/2$-BPSK is robust to IQ mismatch but is affected from power amplifier non-linearity. On the other hand, MSK pulse shaping can be seen as a special case of $\pi/2$-BPSK with constant magnitude. Therefore, the MSK technique is also a viable alternative for odd code sequences. However, the $\pi/2$-BPSK and the MSK pulse shaping techniques are robust to IQ imbalance generally only if M satisfies the proposed criteria of LcM/K is an integer. For other values of M, the robustness to IQ imbalance generally cannot be achieved by these techniques. For even length code sequence (e.g. 544) however, the pi/2-BPSK and MSK pulse shaping are very sensitive to IQ mismatch. The disclosure, e.g. as exemplified herein as pi/3-BPSK modulation technique, is superior in terms of sidelobe suppression in comparison with the aforesaid techniques for even-length code sequences.

Therefore, the disclosure can be helpful in addressing the problem of sidelobe degradation and ghosts in digitally modulated radars such as PMCW and OFDM radars. In these radars, by carefully selecting the waveform sequence and the algorithms for building the radar data cube, an almost ideal ambiguity function can be achieved. However transceiver non-idealities (non-linearity, saturation/clipping, phase noise, IQ imbalance, ADC jitter, and so on) may create a degradation of the ambiguity function that manifests itself by an increase of the range sidelobes and/or the appearance of ghost targets. Range sidelobe degradation translates into a reduced sensitivity and ghost targets translate into false alarms; hence, both must be avoided as much as possible.

The disclosure aims to minimize the effect of power amplifier non-linearity and IQ imbalance. For that purpose, a progressive phase rotation is added to the transmitted signal in order to modify the impact of IQ mismatch from one range profile to another. Therefore, with a defined combination of sequence length Lc, number of accumulation M and phase rotation pi/K, it is therefore possible to cancel the range sidelobes coming from IQ mismatch. In addition, for BPSK PMCW radars, particular phase rotation pi/K strongly improves the robustness to power amplifier non-linearity.

The embodiments of the present disclosure can be implemented by hardware, software, or any combination thereof. Various embodiments of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. A method comprising:
   generating a radar signal in a digital domain comprising a number of M periodic repetitions of a code sequence with a length Lc, multiplied by a first progressive phase rotation $$e^{j \cdot \frac{\pi}{K} \cdot n},$$

where Lc and M are integers, and n is a discrete integer variable; and
   generating a process input signal in the digital domain from a reflection signal corresponding to the radar signal by multiplying the reflection signal with a second progressive phase rotation $$e^{-j\frac{\pi}{K}\cdot n},$$

wherein K is defined such that a first ratio $$\frac{Lc}{K}$$

is a non-integer, and wherein M is defined such that a second ratio $$\frac{Lc\cdot M}{K}$$

is an integer.

2. The method according to claim 1, further comprising correlating the process input signal with respect to the code sequence in order to generate a succession of range profiles.

3. The method according to claim 1, further comprising accumulating a number of M consecutive range profiles.

4. The method according to claim 1, further comprising defining Lc with respect to a maximum unambiguous range of a radar for a given radar bandwidth.

5. The method according to claim 1, further comprising generating the radar signal comprising a number of N periodic repetitions of the number of M periodic repetitions of the code sequence, wherein N is an integer.

6. The method according to claim 5, further comprising processing a number of N range profiles in order to produce a range-Doppler map.

7. The method according to claim 1, wherein the code sequence corresponds to a binary code sequence, a real code sequence, or a complex code sequence.

8. The method according to claim 1, wherein the code sequence corresponds to a binary code sequence.

9. The method according to claim 8, further comprising defining K as:

$$K = \frac{\pm 3}{1+3d}$$

where d is an integer.

10. The method according to claim 1, wherein the code sequence corresponds to a real code sequence.

11. The method according to claim 1, wherein the code sequence corresponds to a complex code sequence.

12. A digitally modulated radar comprising:
a code generation unit configured to generate a radar signal in a digital domain comprising a number of M periodic repetitions of a code sequence with a length Lc, multiplied with a first progressive phase rotation $$e^{j\frac{\pi}{K}\cdot n},$$

where Lc and M are integers, and n is a discrete integer variable; and a processing unit configured to generate a process input signal in the digital domain from a reflection signal corresponding to the radar signal by multiplying the reflection signal with a second progressive phase rotation $$e^{-j\frac{\pi}{K}\cdot n},$$

wherein the code generation unit is further configured to define K such that a ratio $$\frac{Lc}{K}$$

is a non-integer, and
wherein the code generation unit is further configured to define M such that a ratio $$\frac{Lc\cdot M}{K}$$

is an integer.

13. The digitally modulated radar according to claim 12, further comprising a transmission path configured to transmit the radar signal, the transmission path comprising a digital to analog converter, a low pass filter, a mixer, and a power amplifier.

14. The digitally modulated radar according to claim 12, further comprising a reception path configured to receive the reflection signal, the reception path comprising a low noise amplifier, a mixer, a low pass filter, and a analog to digital converter.

15. The digitally modulated radar according to claim 12, wherein the processing unit is further configured to correlate the process input signal with respect to the code sequence in order to generate a succession of range profiles.

16. The digitally modulated radar according to claim 12, wherein the processing unit is further configured to accumulate a number of M consecutive range profiles.

17. The digitally modulated radar according to claim 12, wherein the code sequence corresponds to a binary code sequence, a real code sequence, or a complex code sequence.

18. The digitally modulated radar according to claim 17, wherein the code sequence corresponds to the binary code sequence, and wherein the code generation unit is further configured to define K as a:

$$K = \frac{\pm 3}{1+3d}$$

where d is an integer.

19. The digitally modulated radar according to claim 12, wherein the code sequence corresponds to a real code sequence.

20. The digitally modulated radar according to claim 12, wherein the code sequence corresponds to a complex code sequence.

* * * * *